(12) United States Patent
Abozaed et al.

(10) Patent No.: US 11,392,187 B2
(45) Date of Patent: *Jul. 19, 2022

(54) ENHANCED POWER MANAGEMENT FOR SUPPORT OF PRIORITY SYSTEM EVENTS

(71) Applicant: Intel Corporation, Santa Clara, CA (US)

(72) Inventors: Muhammad Abozaed, Haifa (IL); Eugene Gorbatov, Hillsboro, OR (US); Gaurav Khanna, Hillsboro, OR (US); Avinash N. Ananthakrishnan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 379 days.

This patent is subject to a terminal disclaimer.

(21) Appl. No.: 16/707,932

(22) Filed: Dec. 9, 2019

(65) Prior Publication Data

US 2020/0218320 A1 Jul. 9, 2020

Related U.S. Application Data

(63) Continuation of application No. 16/192,632, filed on Nov. 15, 2018, now Pat. No. 10,503,226, which is a
(Continued)

(51) Int. Cl.
*G06F 1/32* (2019.01)
*G06F 1/26* (2006.01)
(Continued)

(52) U.S. Cl.
CPC ............ *G06F 1/206* (2013.01); *G06F 1/3206* (2013.01); *G06F 9/4843* (2013.01); *G06F 9/4893* (2013.01); *Y02D 10/00* (2018.01)

(58) Field of Classification Search
CPC ........ G06F 1/206; G06F 1/306; G06F 9/4843; G06F 9/4893; Y02D 10/00
See application file for complete search history.

(56) References Cited

U.S. PATENT DOCUMENTS 10,156,877 B2 12/2018 Abozaed et al.
10,503,226 B2 12/2019 Abozaed et al.
(Continued)

OTHER PUBLICATIONS

European Patent Office, "Examination Report", EPO Application No. 17856955.4, dated Jan. 4, 2022, 6 pages.
(Continued)

*Primary Examiner* — Nitin C Patel
(74) *Attorney, Agent, or Firm* — Hanley, Flight & Zimmerman, LLC

(57) ABSTRACT

Embodiments are generally directed to enhanced power management for support of priority system events. An embodiment of a system includes a processing element; a memory including a registry for information regarding one or more system events that are designated as priority events; a mechanism to track operation of events that requires Turbo mode operation for execution; and a power control unit to implement a power management algorithm. The system is to maintain an first energy budget and a second residual energy budget for operation in a Turbo power mode, and wherein the power management algorithm is to determine whether to authorize execution of a detected system event in the Turbo power mode based on the second residual energy budget upon determining that the first energy budget is not sufficient for execution of the detected system event and that the detected system event is designated as a priority event. Priority designations for the priority events may include a first High Priority designation and a second Critical designation.

20 Claims, 4 Drawing Sheets

Related U.S. Application Data continuation of application No. 15/283,349, filed on Oct. 1, 2016, now Pat. No. 10,156,877.

(51) Int. Cl.
*G06F 1/20* (2006.01)
*G06F 9/48* (2006.01)
*G06F 1/3206* (2019.01)

(56) References Cited

U.S. PATENT DOCUMENTS

| | | |
|---|---|---|
| 2009/0113221 A1 | 4/2009 | Hoile et al. |
| 2010/0115304 A1 | 5/2010 | Finkelstein et al. |
| 2012/0210325 A1 | 8/2012 | de Lind Van Wijngaarden et al. |
| 2013/0152098 A1 | 6/2013 | Francois et al. |
| 2014/0173310 A1 | 6/2014 | Tsuji |
| 2014/0365789 A1 | 12/2014 | Seo et al. |
| 2015/0181117 A1 | 6/2015 | Park et al. |
| 2016/0011914 A1 | 1/2016 | Bohn et al. |

OTHER PUBLICATIONS

PCT/US2017/043713 Notification of Transmittal of International Search Report and Written Opinion dated Nov. 8, 2017, 14 pages.

International Search Report and Written Opinion received for PCT Patent Application No. PCT/US2017/043713, dated Nov. 8, 2017, 12 pages.

International Preliminary Report on Patentability received for PCT Patent Application No. PCT/US2017/043713, dated Apr. 11, 2019, 11 pages.

United States Patent and Trademark Office, "Notice of Allowance," mailed in connection with U.S. Appl. No. 16/192,632, dated Aug. 14, 2019, 5 pages.

United States Patent and Trademark Office, "Non-final Office Action," mailed in connection with U.S. Appl. No. 16/192,632, dated Jan. 14, 2019, 7 pages.

United States Patent and Trademark Office, "Notice of Allowance," mailed in connection with U.S. Appl. No. 15/283,349, dated Aug. 16, 2018, 8 pages.

European Patent Office, "Extended European Search Report," mailed in connection with European Patent Application No. 17856955.4, dated Apr. 29, 2020, 8 pages.

ENHANCED POWER MANAGEMENT FOR SUPPORT OF PRIORITY SYSTEM EVENTS

RELATED APPLICATION

The present application is a continuation of and claims the benefit of U.S. patent application Ser. No. 16/192,632, filed Nov. 15, 2018 now U.S. Pat. No. 10,503,226 issued on Dec. 10, 2019 and entitled "ENHANCED POWER MANAGEMENT FOR SUPPORT OF PRIORITY SYSTEM EVENTS", which is a continuation of U.S. patent application Ser. No. 15/283,349, filed on Oct. 1, 2016 now U.S. Pat. No. 10,156,877 issued on Dec. 18, 2018 and entitled "ENHANCED POWER MANAGEMENT FOR SUPPORT OF PRIORITY SYSTEM EVENTS", both which are incorporated by reference in their entirety.

TECHNICAL FIELD

Embodiments described herein generally relate to the field of electronic systems and devices and, more particularly, enhanced power management for support of priority system events.

BACKGROUND

As mobile devices become more powerful and flexible in operation, such devices are being utilized for new purposes. However, such mobile devices are power constrained under many workloads and operating environments. These power limitations are driven by issues such as decreasing form factors, user preference for passively cooled designs, and increasing number of IP (Internet Protocol) and I/O (Input/Output) devices. At the same time, mobile systems are taking on more computationally intensive tasks and require higher level of performance to deliver responsiveness and fluid user experience.

Because most mobile applications events are by their nature brief in operation with long periods of idleness, systems on chips (SoCs) and other mobile computing systems often support a mode or operation, which may be referred to as a Turbo mode, in which steady state power constraints/limits can be exceeded provided that there is energy available in an energy budget, with the energy budget being replenished when the system is idle or is in another reduced operation state. The energy budget is intended to protect the system from excessive thermal energy while allowing the operation of brief events that may exceed steady state limits.

However, such conventional energy budgeting does not provide support for operations and services (generally referred to as system events) that require maximum performance even when energy budget is not available and the system is operating under steady state power and thermal constraints. As a result, device performance and user experience may be severely affected in a depleted energy budget state as the implementation of events, including events that are essential for proper user experience, are throttled back.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
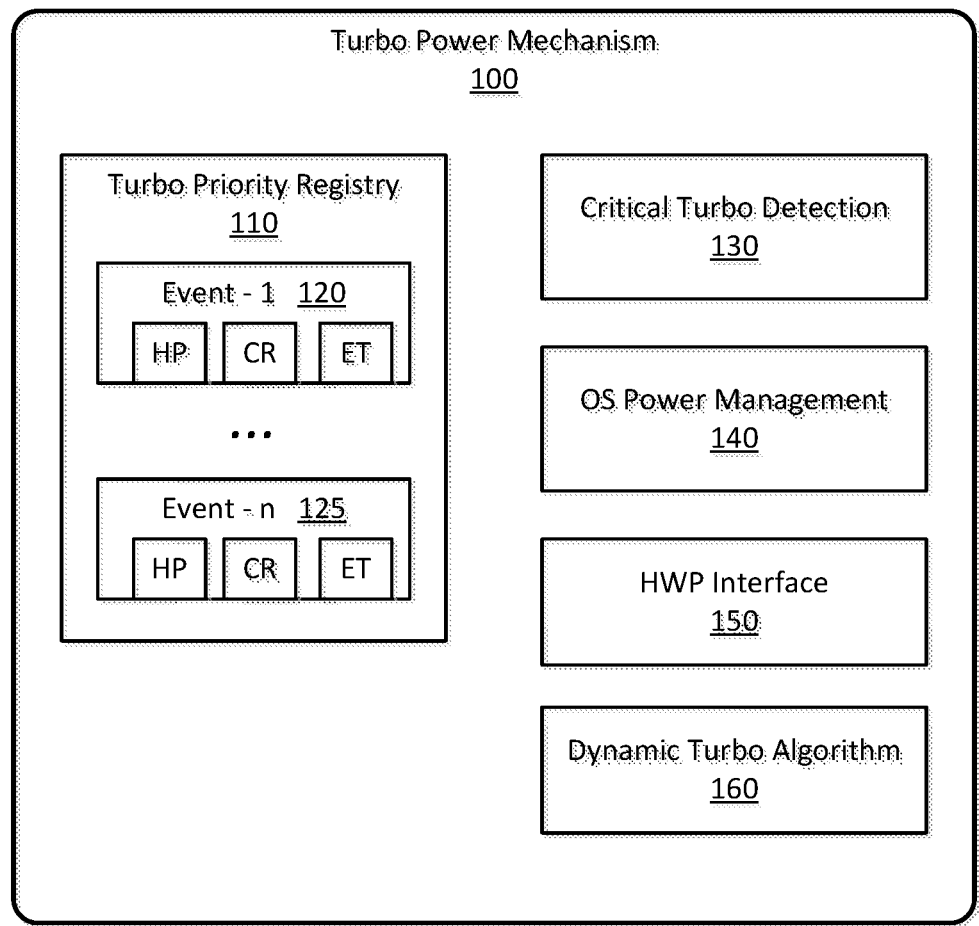
FIG. 1 s an illustration of a mechanism to support priority events in a system according to an embodiment.

Embodiments described herein are generally directed to enhanced power management for support of priority system events.

For the purposes of this description:

"Mobile system" or "mobile device" refers to a smartphone, smartwatch, tablet computer, notebook or laptop computer, handheld computer, mobile Internet device, wearable technology, or other mobile electronic device that includes processing capability.

"System on chip" or "SoC" refers to a chip or integrated circuit (IC) that includes all components of a computing system, including, for example, all components of a computer.

"Event" refers to an application, operation, service, or other function that is executed by a system.

"Priority event" refers to an event for a mobile computing system that is designated as high priority, critical, or other enhanced priority by one or more means.

In the operation of a mobile system, the execution of certain events is of critically important for user experience and interaction. Launching an application, responding to an UI (user interface) event, or maintaining fluidity of experience during touch inputs (utilizing a touch sensitive surface) or other user interactions (for example a photo application) are certain examples of system events for which the quality of system performance is extremely important for the overall user experience. During such priority system events, it is important for the system to deliver maximum performance. If performance lags for a priority event, a mobile device will appear to be sluggish or unresponsive to user control, greatly diminishing the user experience in utilizing the mobile device.

To implement a Turbo mode to address the execution of priority events, power management algorithms (which may be referred to as Turbo algorithms) are utilized to determine whether energy in a system energy budget may be expended for a particular request (which may be referred to as a Turbo request). The Turbo algorithm is generally implemented by a Power Control Unit (PCU) or other power element in the SoC or other computing system.

However, a power management algorithm is commonly designed to use the available energy budget for the Turbo requests, and, when the energy budget is depleted, to then throttle the system performance back to levels needed to maintain the steady state operation and thermal limitations for the system, wherein the thermal limitations may include skin temperature and other thermal issues.

However, existing hardware and software power management algorithms for computing systems do not sufficiently account for priority events in system operation. Conventional power management algorithms commonly provide for utilizing the energy budget for an application or other event whenever the energy budget is available, and, when the energy budget is then depleted, significantly reducing SoC or other system performance to remain within the thermal and power limits for the system. For this reason, device performance and user experience may be severely affected in when the system is in a depleted energy budget state.

In some embodiments, an apparatus, system, or process includes an enhanced power management mechanism to maintain responsiveness and performance for priority system events that can directly impact user experience, wherein the power management mechanism provides support for such priority events even as energy budget limitations and soft thermal limitations (i.e., thermal limitations that are not critical to device operation) are faced. In contrast, conventional logic implementations allow for exhausting the available energy budget on non-priority execution, and thus do not adequately support priority events. Further, conventional implementations prohibit violation of soft thermal limits even if a brief allowance of soft thermal limit violations would significantly benefit device performance and user experience for certain critical events.

An event may be designated as a priority event by applications, by the OS (operating system), or by an OEM (Original Equipment Manufacturer) and registered with the system. Embodiments are not limited to a single priority designation, and may include designation of one of a plurality of enhanced priority levels, for example designation of events as high priority or critical.

In some embodiments, a second residual energy budget is maintained to enable energy budgeting for events that are deemed to be priority events when the first general energy budget is depleted or insufficient for execution of a particular event. The status of the system energy budget is utilized to determine whether a certain event or application execution that requires a certain thermal energy is allowed to provide the user experience for the execution of the event. In some embodiments, the system energy budget is expended prior to expending the residual energy budget, and the residual energy budget is replenished (or filled) prior to replenishing the system energy budget to enable execution of priority events before other non-priority events. In some embodiments, certain designated priority events are allowed to exceed the energy budget by drawing on the residual energy budget. In some embodiments, certain designated events, such as critical events, are further allowed to proceed despite depletion of the residual budget by authorizing exceeding of a soft thermal limit by a certain margin.

In some embodiments, an apparatus, system, or process provides a power management mechanism to maintain responsiveness and performance for priority system events including the following:

(1) Residual Energy Budget—The apparatus, system, or process is to maintain a sufficient residual energy budget (a second energy budget) in addition to the system energy budget to allow execution of priority events. The designation of specific events as priority events may be specified by, for example, applications run on a computing system, the OS (operating system) for the computing system, or by an OEM (Original Equipment Manufacturer) with the OEM designations then being registered with the system. In some embodiments, the system maintains a list of such designated priority events as well as their expected duration. When priority events occur or are executed in the system, the operating detects the priority event and provides a notification to the hardware to prioritize the execution of the event and enable the use of the residual energy budget even if the overall system energy budget is not available.

(2) Request to Exceed Limits for Critical Events—For events that are critical for system functionality and responsiveness, the OS may request the SoC or system to exceed soft thermal limits (thermal limits that are not essential for device operation, and thus violation of which won't result in, for example, a system malfunction or crash) by a certain margin.

An example of a soft thermal limit that may be exceeded by a certain margin is skin temperature, $T_{SKIN}$, as skin temperature of a system is generally a comfort factor rather than an operational limit. The allowance of reasonable violations of such thermal limits allows critical system events to be provided a highest level of performance despite violation of some of the "soft" power and thermal limits.

In some embodiments, an apparatus, system, or process provides a registry means to maintain information regarding which events are priority events, and provides means for supporting such registry in hardware or software. In some embodiments, an apparatus, system, or process includes a determining means for determining whether that a priority event is occurring and enabling execution of such event dependent on the residual budget and allowance for exceeding thermal limits. In some embodiments, an apparatus, system, or process includes an enhanced algorithm to determine whether to expend energy for events based on the priority of the event, the energy required for the event, the state of the energy budget and residual energy budget, and the potential exceeding of soft thermal limits.

FIG. 1 is an illustration of a mechanism to support priority events in a system according to an embodiment. In some embodiments, within a mobile system original equipment manufacturers (OEMs), or other elements may designate certain system events as priority events that require maximum Turbo performance in execution. FIG. 1 illustrates certain elements of a Turbo power mechanism 100 of a system. In some embodiments, the mechanism 100 includes hardware and software elements to provide system power management that supports priority event execution.

In some embodiments, information regarding the designated priority events is stored by the operating system (OS) via an OS API (application programming interface) or other means in a registry, which may be referred to as a Turbo Priority Registry (TPR) 110. As illustrated in FIG. 1, the registry 110 includes information for events designated as Event-1 120 through Event-n 125. In some embodiments, the information in the registry 110 provides at least one parameter associated with each event to indicate a priority designation. However, embodiments are not limited to a single priority designation, and a system may include a plurality of priority designations, such as two parameters associated with each event 120-125 in the Turbo Priority Registry 110 as illustrated in FIG. 1, the parameters being the following:

High Priority (HP): The HP parameter specifies if event execution is "high priority" and thus should be allowed to use residual energy budget (rEB) if the overall system energy budget is exhausted.

Critical (CR): The CR parameter specifies if the application or event execution is "critical", and thus the event should be allowed to exceed soft thermal limits by a certain margin to execute the event.

In some embodiments, the registry 110 may include further information regarding the priority events. For example, the additional information may include an estimated length of time required for execution of each event 120-125, shown as ET. However, embodiments are not limited to the information illustrated in FIG. 1, and the registry may include other and different information regarding priority events.

In some embodiments, the operating system of a mobile system implements a Critical Turbo Detection (CTD) mechanism 130 that tracks currently active priority events. The active events may either be detected automatically by the operating system (for example, a photo application launch) or explicitly triggered through an API by applications that have registered such events in the Turbo Priority Registry 110.

When priority events are detected, the CTD 130 passes information regarding the active events to a power management element such as OS Power Management (OSPM) 140, which uses a hardware performance states (HWP, or Hardware P-states) interface 150 to convey this request to a hardware dynamic Turbo algorithm 160 to implement power management rules. In some embodiments, the algorithm is implemented by a power control unit of the system.

The HWP interface 150 allows the operating system to request a desired performance level between HWP Lowest and Highest performance levels, and further provides the ability to dynamically configure minimum and maximum performance range. In some embodiments, the HWP interface is extended to support priority Turbo requests that (1) allow the hardware to use residual energy budget and (2) allow the hardware to exceed soft thermal limits for short durations.

Figure 2:
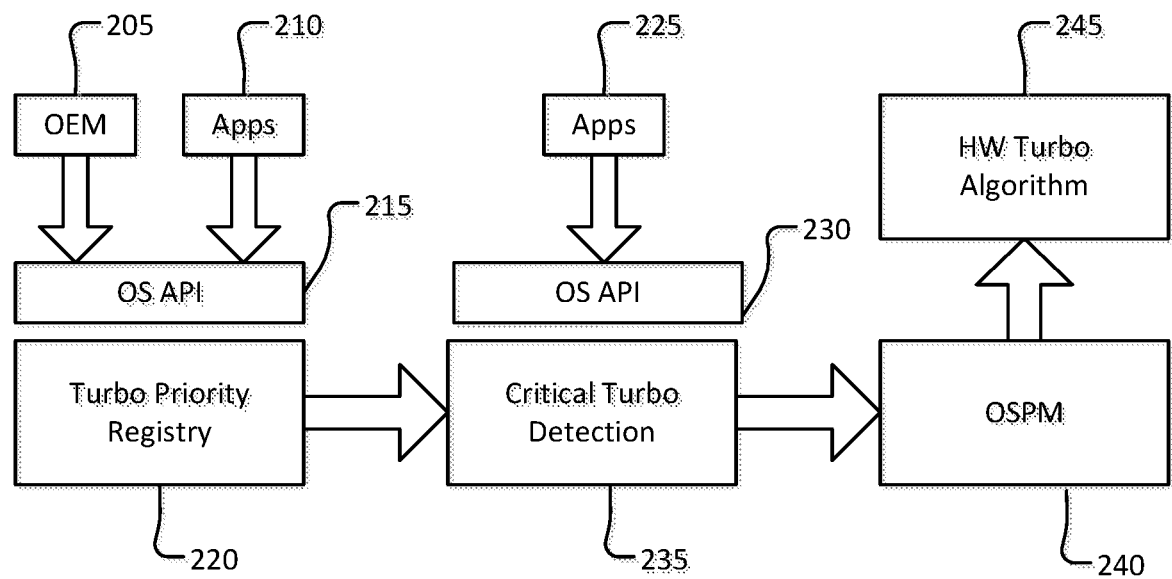
FIG. 2 is an illustration of a process flow for enhanced power management to support execution of priority events in a system according to an embodiment.

FIG. 2 is an illustration of a process flow for enhanced power management to support execution of priority events in a system according to an embodiment. In some embodiments, an original equipment manufacturer (OEM) 205 or one or more applications 210 operate via an operating system API 215 to specify priority system events that require maximum Turbo performance. In some embodiments, information regarding the designated priority events is stored by the operating system via OA API 215 in a Turbo priority registry (TPR) 220.

In some embodiments, there are one or more parameters associated with each event in the Turbo priority register 220 to indicate event priority. In a particular implementation, the parameters to indicate event priority are the following:

High Priority (HP): The HP parameter specifies if event execution is "high priority" and thus should be allowed to use residual energy budget (rEB) if overall energy budget is exhausted.

Critical (CR): The CR parameter specifies if the event execution is "critical", and thus the SoC can exceed soft thermal limits by a small margin to execute this event. However, embodiments are not limited to such "High Priority" and "Critical: event designations.

In some embodiments, the Turbo priority 220 includes other information regarding each event, wherein the other information includes an expected length of execution for the event.

In some embodiments, as FIG. 2 illustrates, the operating system implements a cCritical Turbo Detection (CTD) mechanism 235 that tracks currently active priority Turbo events. The active events may either be detected automatically by the operating system (for example, a photo application launch) or explicitly triggered through an API 230 by applications that have registered such events in the Turbo Priority Registry 220.

When priority events are detected, the CTD mechanism 235 passes information regarding the events to OS Power Management (OSPM) 240, wherein the OSPM may utilize a hardware performance states (HWP, or Hardware P-states) interface to convey this request to a hardware dynamic Turbo algorithm to be implemented by a power control unit of the system. The HWP interface is extended to support priority Turbo requests in order to (1) allow the execution of a high priority event to use residual energy budget and (2) allow the execution of a critical event to exceed soft thermal limits for short durations.

Figure 3:
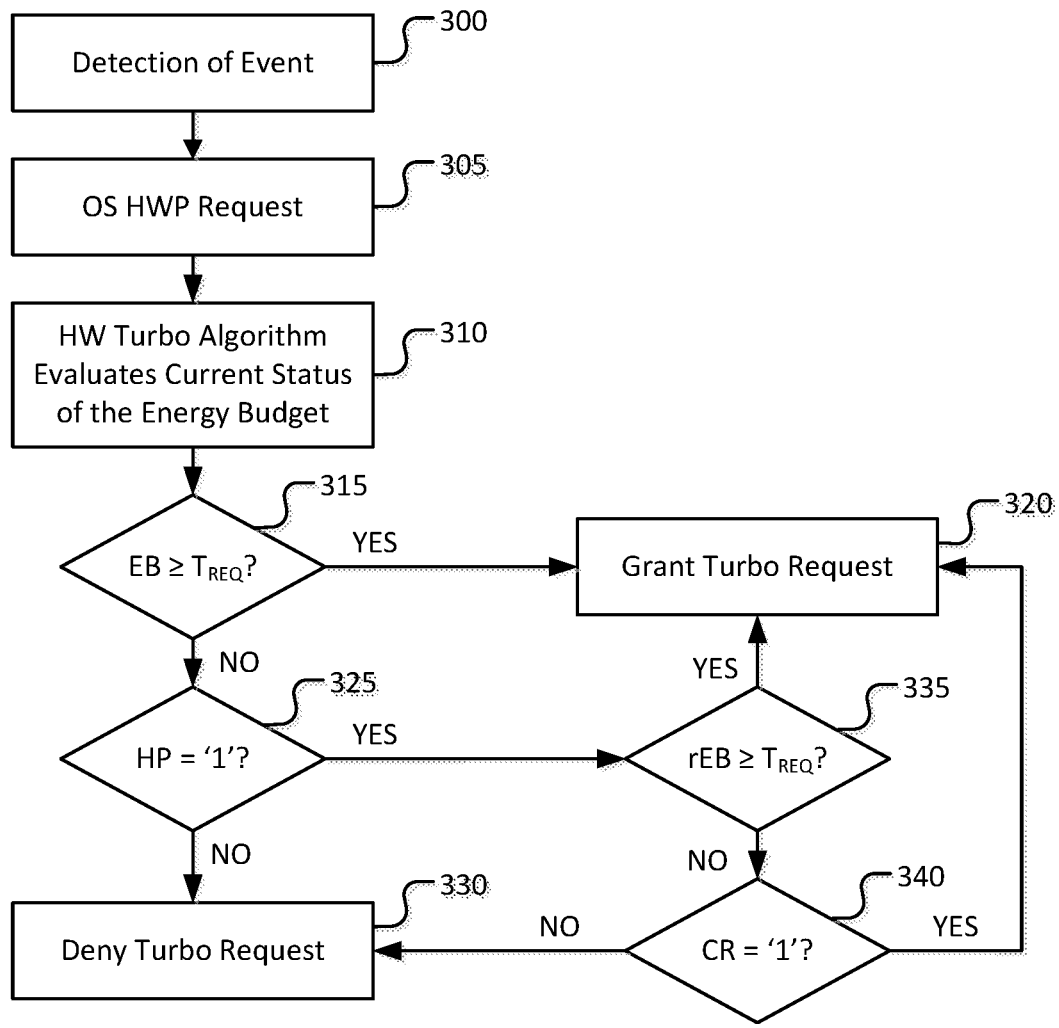
FIG. 3 is an illustration of an enhanced power management process to provide support for priority events according to an embodiment.

FIG. 3 is an illustration of an enhanced power management process to provide support for priority events according to an embodiment. In some embodiments, a process includes the following for a system, the system being, for example, an SoC:

300: An event requiring Turbo power management and energy budgeting is detected. In some instances the energy requirements may for the event may be budgeted in the system Turbo energy budget. However, a priority event, such as an event designated as High Priority or Critical in a particular implementation, may require execution even if the general Turbo energy budget is not sufficient for the event.

305: The OS power management or other power management entity utilizes an HWP request (a Turbo request) to request Turbo operation for the detected event, wherein one or more parameters of the request specify a priority designation for the event, which in this example indicates whether the event to be executed is a High Priority (HP) or Critical (CR) event. In the illustrated implementation, a Critical event will have both the HP and CR parameters enabled, but embodiments are not limited to this particular implementation.

310: A HW Turbo algorithm implemented by a power control unit of the system evaluates the current status of the system energy budget (EB) to determine energy budget availability for the event, i.e., whether the current energy budget is sufficient for the Turbo request ($T_{REQ}$)

315: The Turbo algorithm determines whether the system energy budget is equal to or greater than the energy required for the Turbo request, illustrated as $EB \geq T_{REQ}$.

320: If the system energy budget is sufficient for the Turbo request ($EB \geq T_{REQ}$), the Turbo request is granted, and the energy required for the execution of the event is deducted from the system energy budget.

325: If the system energy budget is not sufficient for the Turbo request (i.e., $EB < T_{REQ}$), the Turbo mechanism is to then determine if the event is a priority event based upon the received request. In the implementation illustrated in FIG. 3, a determination is made regarding whether the High Priority (HP) parameter for the request is set (illustrated as HP='1'), indicating that the event is a High Priority event.

330: If the HP parameter is not set for the event, indicating that the event is a non-priority event, then the Turbo request is denied because the system energy budget is not sufficient for the non-priority event.

335: If the HP parameter is set, the process then proceeds with evaluating the current residual energy budget (rEB) set aside for priority (CR and HP) events. If the residual energy budget is available for the Turbo request ($rEB \geq T_{REQ}$), then the Turbo request is granted, 320.

340: If energy currently available in the rEB is not sufficient for the Turbo request, the process proceeds with checking if the Critical parameter (CR) is set for the current execution. If critical parameter is set (CR='1'), thus indicating that the process is a Critical event, the Turbo process allows the system to exceed soft thermal limits (for example skin temperature for the system) by a certain amount, and the Turbo Request is granted, 320. If the Critical parameter is not set, then the Turbo Request is denied, 330.

Figure 4:
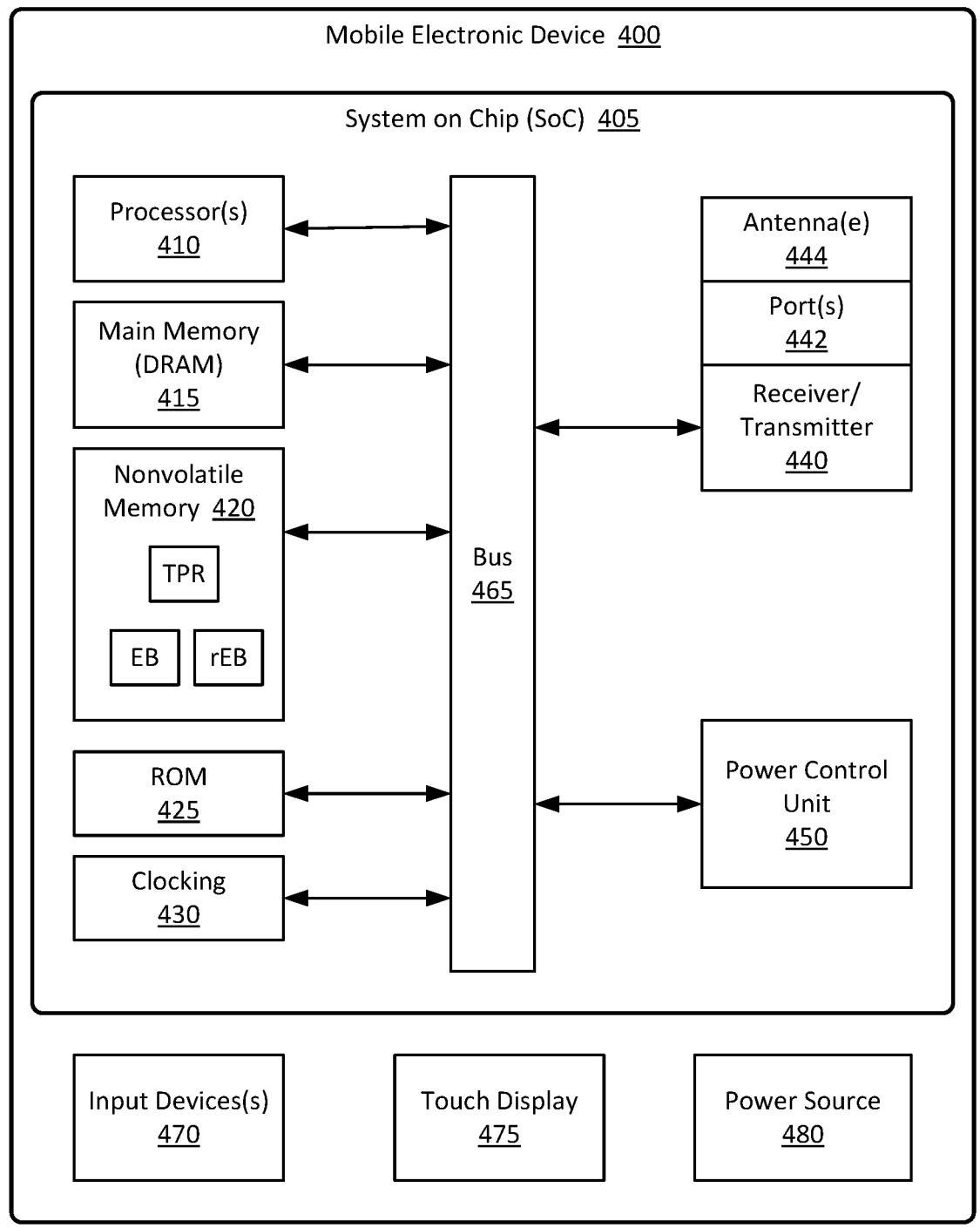
FIG. 4 is an illustration of an embodiment of a mobile electronic device including enhanced power management according to an embodiment.

FIG. 4 is an illustration of an embodiment of a mobile electronic device including enhanced power management according to an embodiment. In this illustration, certain standard and well-known components that are not germane to the present description are not shown. Elements shown as separate elements may be combined or otherwise modified.

In some embodiments, a mobile electronic device 400 includes a system on chip (SoC) 405. In some embodiments, the SoC 405 provides the elements of the enhanced power management mechanism as illustrated in FIG. 1. In some embodiments, the system on chip 405 is operable to implement the processes illustrated in FIGS. 2 and 3.

In some embodiments, the SoC 405 may include a processing means such as one or more processors 410 coupled to one or more buses or interconnects, shown in general as bus 465. The processors 410 may comprise one or more physical processors and one or more logical processors. In some embodiments, the processors may include one or more general-purpose processors or special-processor processors.

The bus 465 is a communication means for transmission of data. The bus 465 is illustrated as a single bus for simplicity, but may represent multiple different interconnects or buses and the component connections to such interconnects or buses may vary. The bus 465 shown in FIG. 4 is an abstraction that represents any one or more separate physical buses, point-to-point connections, or both connected by appropriate bridges, adapters, or controllers.

In some embodiments, the SoC 405 further comprises computer memory, wherein the computer memory may include a random access memory (RAM) or other dynamic storage device or element as a main memory 415 for storing information and instructions to be executed by the processors 410. Main memory 415 may include, but is not limited to, dynamic random access memory (DRAM).

The SoC 405 may further include a non-volatile memory 420, such as flash memory or other non-volatile technology. In some embodiments, the non-volatile memory 420 includes support for a Turbo Priority Registry (TPR), which may include the Turbo Priority Registry 110 illustrated in FIG. 1 and the Turbo Priority Registry 220 illustrated in FIG. 2. In some embodiments, the non-volatile memory 420 includes support for a first energy budget (EB) for Turbo operation and a second residual energy budget (rEB) to provide enhanced support for priority system events.

In some embodiments, the SoC 405 further includes a read only memory (ROM) 425 or other static storage device for storing static information and instructions for the processors 410. In some embodiments, the SoC includes one or more clocking or timing elements 430, including one or more oscillators and phase lock loops (PLLs).

In some embodiments, the SoC 405 includes one or more transmitters or receivers 440 coupled to the bus 465. In some embodiments, the SoC 405 may include one or more antennae 444, such as dipole or monopole antennae, for the transmission and reception of data via wireless communication using a wireless transmitter, receiver, or both, and one or more ports 442 for the transmission and reception of data via wired communications. Wireless communication includes, but is not limited to, Wi-Fi, Bluetooth™, near field communication, and other wireless communication standards.

In some embodiments, the SoC 405 includes a power control unit 450, wherein the power control unit includes support for the enhanced power management illustrated in FIGS. 2 and 3 including implementation of an enhanced Turbo algorithm.

In some embodiments, the mobile device 400 further includes one or more input devices 470 for the input of data, including hard and soft buttons, a joy stick, a mouse or other pointing device, a keyboard, voice command system, or gesture recognition system. In some embodiments, the mobile device includes a touch display 475 or other output display. In some environments, the touch display is utilized as at least a part of an input device 470. In some embodiments, the mobile device may further include audio output, including one or more speakers, audio output jacks (or wireless only audio output), and other output to the user.

The system 400 may also comprise a battery or other power source 480, which may include a solar cell, a fuel cell, a charged capacitor, near field inductive coupling, or other system or device for providing or generating power in the mobile electronic device 475. The power provided by the power source 480 may be distributed as required to elements of the handheld device 400, including operation of the SoC 405.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, a system includes a processing element; a memory including a registry for information regarding one or more system events that are designated as priority events; a mechanism to track operation of events that requires Turbo mode operation for execution; and a power control unit to implement a power management algorithm, wherein the system is to maintain a first energy budget and a second residual energy budget for operation in a Turbo power mode, and wherein the power management algorithm is to determine whether to authorize execution of a detected system event in the Turbo power mode based on the second residual energy budget upon determining that the first energy budget is not sufficient for execution of the detected system event and that the detected system event is designated as a priority event.

In some embodiments, the power management algorithm is further to determine whether to authorize the detected system event to exceed a thermal limit for a certain period upon determining that the second residual energy budget is not sufficient for execution of the detected system event and the detected system event is designated as a priority event.

In some embodiments, the thermal limit is a soft thermal limit that is not essential for system operation.

In some embodiments, priority designations for the priority events include a first High Priority designation and a second Critical designation, wherein determining whether to authorize the detected system event to exceed the thermal limit includes determining that the detected system event is designated as a Critical event.

In some embodiments, the one or more events designated as Critical events include launching an application, responding to a user interface event, and responding to a touch input to the system.

In some embodiments, the registry includes one or more parameters for a priority designation of each event stored in the registry.

In some embodiments, the registry further includes information regarding an estimate of an execution length for each event stored in the registry.

In some embodiments, the first energy budget and second residual energy budget are replenished when the system is in a reduced operation state, the second residual energy budget being replenished before the first energy budget.

In some embodiments, the system is a system on chip (SoC).

In some embodiments, a non-transitory computer-readable storage medium having stored thereon data representing sequences of instructions that, when executed by a processor, cause the processor to perform operations including storing information in a registry regarding one or more events for a system that are designated as priority events; maintaining a first energy budget and a second residual energy budget for the system; detecting a system event that requires a Turbo mode operation; and determining whether to authorize execution of the detected system event based on a power management algorithm, the algorithm including determining whether the first energy budget is sufficient for execution of the detected system event, upon determining that the first energy budget is not sufficient for execution of the detected system event, further determining whether the detected system event is a priority event, and upon determining that the detected system event is designated as a priority event, determining if the second residual energy budget is sufficient for execution of the detected system event.

In some embodiments, the instructions further include, upon determining that the second residual energy budget is not sufficient for execution of the detected system event, determining whether the detected system event is designated as a critical event; and upon determining that the detected system event is designated as a critical event, authorizing the detected system event to exceed a thermal limit for a certain period.

In some embodiments, the thermal limit is a soft thermal limit that is not essential for system operation.

In some embodiments, the instructions further include receiving designations of priority events from one or more of a system application; an operating system; or a registration of an event with the system.

In some embodiments, storing information in the registry includes storing one or more parameters for a priority designation of each event stored in the registry.

In some embodiments, storing information in the registry further includes storing an estimate of an execution length for each event stored in the registry.

In some embodiments, the instructions include replenishing the first energy budget and second residual energy budget when the system is in a reduced operation state, the second residual energy budget being replenished before the first energy budget.

In some embodiments, an apparatus includes means for storing information in a registry regarding one or more events for a system that are designated as priority events; means for maintaining a first energy budget and a second residual energy budget for the system; means for detecting a system event that requires a Turbo mode operation; and means for determining whether to authorize execution of the detected system event based on a power management algorithm, the algorithm including determining whether the first energy budget is sufficient for execution of the detected system event, upon determining that the first energy budget is not sufficient for execution of the detected system event, further determining whether the detected system event is a priority event, and upon determining that the detected system event is designated as a priority event, determining if the second residual energy budget is sufficient for execution of the detected system event.

In some embodiments, the apparatus further includes means for determining whether the detected system event is designated as a critical event upon determining that the second residual energy budget is not sufficient for execution of the detected system event; and means for authorizing the detected system event to exceed a thermal limit for a certain period upon determining that the detected event is designated as a critical event.

In some embodiments, the thermal limit is a soft thermal limit that is not essential for system operation.

In some embodiments, the apparatus further includes means for receiving designations of priority events from one or more of a system application; an operating system; or a registration of an event with the system.

In some embodiments, the means for storing information in the registry includes means for storing one or more parameters for a priority designation of each event stored in the registry.

In some embodiments, the means for storing information in the registry further includes means for storing an estimate of an execution length for each event stored in the registry.

In some embodiments, the apparatus includes means for replenishing the first energy budget and second residual energy budget when the system is in a reduced operation state, the second residual energy budget being replenished before the first energy budget.

In some embodiments, a mobile device including a system on chip (SoC), the SoC including a processing element, a memory including a registry for information regarding one or more SoC events that are designated as priority events, a mechanism to track operation of events that requires Turbo mode operation for execution, a transmitter or receiver and antenna, and a power control unit to implement a power management algorithm; a touch display; and a power source for the mobile device, wherein the SoC is to maintain a first energy budget and a second residual energy budget for operation in a Turbo power mode, and wherein the power management algorithm is to determine whether to authorize execution of a detected SoC event in the Turbo power mode based on the second residual energy budget upon determining that the first energy budget is not sufficient for execution of the detected SoC event and that the detected SoC event is designated as a priority event.

In some embodiments, the power management algorithm is further to determine whether to authorize the detected SoC event to exceed a thermal limit for a certain period upon determining that the second residual energy budget is not sufficient for execution of the detected SoC event and the detected SoC event is designated as a priority event.

In some embodiments, the thermal limit is a soft thermal limit that is not essential for SoC operation.

In some embodiments, priority designations for the priority events include a first High Priority designation and a second Critical designation, wherein determining whether to authorize the detected system event to exceed a thermal limit includes determining that the detected system event is designated as a Critical event.

What is claimed is:

1. A system comprising:
   a processing element;
   a memory including a registry for storing information regarding one or more system events that are designated as priority events;
   a mechanism to track operation of the system events; and
   a power control unit, including circuitry, operable to maintain a residual energy budget and authorize execution of a detected system event based on availability of energy in the residual energy budget and based on the detected system event being designated as a priority event that causes a power limit to be exceeded when executed with energy from the residual energy budget.

2. The system defined in claim 1 wherein the mechanism to track operation of events is operable to track events for which execution may exceed the power limit.

3. The system defined in claim 1 wherein the power limit comprises a thermal limit.

4. The system defined in claim 1 wherein the power control unit is operable to implement a power management algorithm and to maintain a first energy budget for general operation, wherein the residual energy budget is used for an event that is deemed to be a priority event, when the first energy budget is depleted or insufficient for execution of the event.

5. The system defined in claim 4 wherein the power control unit prevents execution of the detected system event if the detected system event is not designated as a priority event.

6. The system defined in claim 4 wherein the power control unit is operable to determine whether to authorize execution of the detected system event based on the detected system event being designated as a priority event that causes a power limit to be exceeded when executed with energy from the residual energy budget.

7. The system defined in claim 6 wherein the power limit comprises a thermal limit.

8. The system defined in claim 4 wherein the power control unit is operable to:
   evaluate a current status of the first energy budget;
   authorize execution of the detected system event if the first energy budget is determined to be above a first threshold; and
   if the first energy budget is not determined to be above the first threshold, then
      determine whether the detected system event is a priority event of a first level of priority,
      authorize execution of the detected system event if the residual energy budget is determined to be above a second threshold, and
      authorize execution of the detected system event if the residual energy budget is not above a second threshold and the detected system event is a priority event of a second level of priority greater than the first level of priority.

9. The system defined in claim 8 wherein the second level of priority is a system critical level of priority.

10. The system defined in claim 1 wherein the power control unit is operable to authorize execution of the detected system event when on the detected system event being designated as a priority event that causes a power limit to be exceeded when executed with energy from the residual energy budget and the detected system event is determined to have a level of priority higher than one or more other priority events.

11. A non-transitory computer-readable storage media having stored thereon data representing sequences of instructions that, when executed by a processor, cause the processor to perform operations comprising:
   storing information in a registry regarding one or more events for a system that are designated as priority events;

maintaining a residual energy budget for the system;
detecting a system event; and
determining whether to authorize execution of a detected system event based on availability of energy in the residual energy budget and based on the detected system event being designated as a priority event that causes a power limit to be exceeded when executed with energy from the residual energy budget.

12. The media defined in claim 11 wherein the operations further comprise tracking events for which execution may exceed the power limit.

13. The media defined in claim 11 wherein the power limit comprises a thermal limit.

14. The media defined in claim 11 wherein the operations further comprise:
performing a power management algorithm; and
maintaining a first energy budget for general operation, wherein the residual energy budget is used for an event that is deemed to be a priority event, when the first energy budget is depleted or insufficient for execution of the event.

15. The media defined in claim 14 wherein the operations further comprise preventing execution of the detected system event if the detected system event is not designated as a priority event.

16. The media defined in claim 14 wherein the operations further comprise determining whether to authorize execution of the detected system event based on the detected system event being designated as a priority event that causes a power limit to be exceeded when executed with energy from the residual energy budget.

17. The media defined in claim 16 wherein the power limit comprises a thermal limit.

18. The media defined in claim 14 wherein the operations further comprise:
evaluating a current status of the first energy budget;
authorizing execution of the detected system event if the first energy budget is determined to be above a first threshold; and
if the first energy budget is not determined to be above the first threshold, then
determining whether the detected system event is a priority event of a first level of priority,
authorizing execution of the detected system event if the residual energy budget is determined to be above a second threshold, and
authorizing execution of the detected system event if the residual energy budget is not above a second threshold and the detected system event is a priority event of a second level of priority greater than the first level of priority.

19. The media defined in claim 18 wherein the second level of priority is a system critical level of priority.

20. The media defined in claim 11 wherein the operations further comprise authorizing execution of the detected system event when on the detected system event being designated as a priority event that causes a power limit to be exceeded when executed with energy from the residual energy budget and the detected system event is determined to have a level of priority higher than one or more other priority events.

* * * * *